US009849416B2

(12) United States Patent
Clayton, Jr.

(10) Patent No.: US 9,849,416 B2
(45) Date of Patent: Dec. 26, 2017

(54) METHOD FOR CLEANING EXHAUST FILTER SYSTEM

(71) Applicant: Caterpillar Inc., Peoria, IL (US)

(72) Inventor: Robert D. Clayton, Jr., Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 195 days.

(21) Appl. No.: 14/887,419

(22) Filed: Oct. 20, 2015

(65) Prior Publication Data
US 2017/0106322 A1    Apr. 20, 2017

(51) Int. Cl.
B01D 46/00    (2006.01)
F01N 3/023    (2006.01)

(52) U.S. Cl.
CPC ....... *B01D 46/006* (2013.01); *B01D 46/0068* (2013.01); *F01N 3/023* (2013.01); *F01N 3/0232* (2013.01); *B01D 2279/30* (2013.01)

(58) Field of Classification Search
CPC ............. B01D 46/006; B01D 46/0068; B01D 2279/30; F01N 3/023; F01N 3/0232; F01N 3/0233
See application file for complete search history.

(56) References Cited

U.S. PATENT DOCUMENTS

| | | | |
|---|---|---|---|
| 4,167,852 A | 9/1979 | Ludecke | |
| 4,485,622 A * | 12/1984 | Takagi | B01D 46/30 55/282 |
| 4,730,454 A * | 3/1988 | Pischinger | F01N 3/023 55/302 |
| 5,390,492 A | 2/1995 | Levendis | |
| 5,634,952 A * | 6/1997 | Kasai | F01N 3/023 55/302 |
| 8,801,818 B2 | 8/2014 | Albrecht et al. | |
| 2001/0037729 A1* | 11/2001 | Machida | F01N 3/023 95/278 |
| 2006/0070360 A1* | 4/2006 | Sellers | B01D 46/0064 55/303 |
| 2006/0070361 A1* | 4/2006 | Sellers | B01D 46/0064 55/303 |

FOREIGN PATENT DOCUMENTS

| | | |
|---|---|---|
| CN | 104234793 | 12/2014 |
| DK | 177575 B1 | 10/2013 |
| WO | 2014169967 | 10/2014 |

OTHER PUBLICATIONS https://www.cdc.gov/air/particulate_matter.html, Sep. 2013.*
http://www.ewg.org/research/sandstorm/health-concerns-silica-outdoor-air, Oct. 2014.*

* cited by examiner

Primary Examiner — Amber R Orlando

(57) ABSTRACT

A method for cleaning an exhaust filter system is provided. The method includes removing ash from a first end of the exhaust particulate filter system using compressed air from the second end of the exhaust particulate filter system. The method also includes entraining particles from a second end of the exhaust particulate filter system using low pressure air. The method further includes blowing ash from the first end of the exhaust particulate filter system using compressed air from the second end of the exhaust particulate filter system. The method further includes removing the entrained particles from the second end of the exhaust particulate filter system.

9 Claims, 7 Drawing Sheets

METHOD FOR CLEANING EXHAUST FILTER SYSTEM

TECHNICAL FIELD

The present disclosure relates to a method of cleaning an exhaust particulate filter system.

BACKGROUND

Exhaust particulate filter systems are one of many types of emission control technologies that lower particulate matter emissions. Typically, an exhaust particulate filter system includes a housing containing filters. The filters include filter walls that are arranged in parallel with spaces in between. The spaces between the filter walls are closed at every alternate end. Exhaust gases that enter the filter assembly through an opening must pass through filter walls in order to exit the filter assembly. Exhaust matter such as soot and ash that is unable to pass through walls is prevented from exiting the filter assembly.

By trapping exhaust particulate matter as the exhaust gases pass through the filter, exhaust particulate filter systems are able to substantially reduce particulate matter emissions and assist in complying with increasingly stringent emissions standards. While the filter assemblies are generally effective and easy to maintain, they require periodic cleaning, for example at 5000 hours.

U.S. Pat. No. 5,390,492 describes a system in which an incineration chamber is provided downstream of the particulates dislodged from the particulate trap during regeneration thereof by a pulse of compressed air. During regeneration, a valve between the particulate trap and the incineration chamber opens to allow the air and entrained particles to pass into the incineration chamber. A secondary filter is mounted within the incineration chamber to allow passage of the regeneration air therethrough, but prevent passage of the particulates, whereby the particulates are retained in the incineration chamber. A heater in the incineration chamber is periodically activated to burn the particulates collected in the trap. The oxidation products may be released or may be returned to the engine intake in an exhaust gas recirculation system.

SUMMARY OF THE DISCLOSURE

In one aspect of the present disclosure, a method for cleaning an exhaust filter system is provided. The method includes removing soot from the first end of the exhaust particulate filter system. The method also includes entraining particles from the second end of the exhaust particulate filter system. The method further includes blowing ash from the first end of the exhaust particulate filter system. The method also includes removing the entrained particles from the second end of the exhaust particulate filter system.

In another aspect of the present disclosure, a method of cleaning an exhaust particulate filter system including a first end and a second end is provided. The method includes removing accumulated soot by oxidation from the exhaust particulate filter system. The method also includes blowing the ash from the first end of the exhaust particulate filter system using compressed air from the second end of the exhaust particulate filter system. The method further includes entraining particles from the second end of the exhaust particulate filter system using low pressure air. The method also includes blowing ash from the first end of the exhaust particulate filter system using compressed air from the second end of the exhaust particulate filter system. The method includes removing the entrained particles from the second end of the exhaust particulate filter system using compressed air from the first end of the exhaust particulate filter system. In addition, the entrained particles may be powdered carbon black.

Other features and aspects of this disclosure will be apparent from the following description and the accompanying drawings.

DETAILED DESCRIPTION

Figure 1:
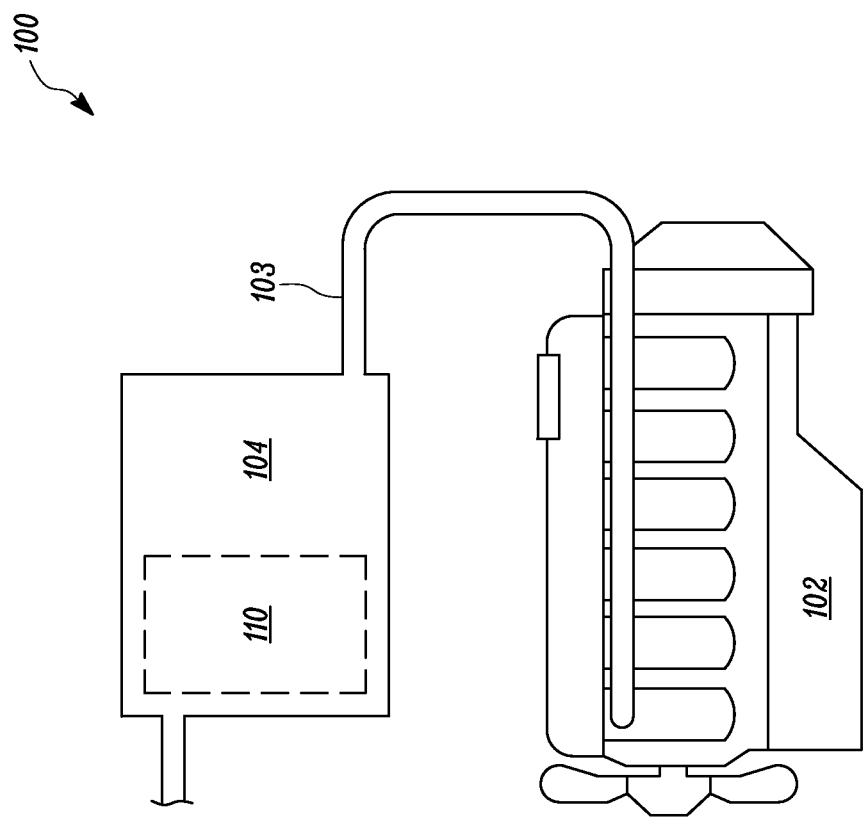
FIG. 1 is a schematic view of an exemplary engine system, according to one embodiment of the present disclosure.

Wherever possible, the same reference numbers will be used throughout the drawings to refer to the same or the like parts. Referring to FIG. 1, a schematic diagram of an exemplary engine system 100 is illustrated, according to one embodiment of the present disclosure. The engine system 100 includes an engine 102, which may be an internal combustion engine, such as, a reciprocating piston engine or a gas turbine engine. The engine 102 may be a spark ignition engine or a compression ignition engine, such as a diesel engine, a homogeneous charge compression ignition engine, or a reactivity controlled compression ignition engine, or other compression ignition engines known in the art. The engine 102 may be fueled by gasoline, diesel fuel, biodiesel, dimethyl ether, alcohol, natural gas, propane, hydrogen, combinations thereof, or any other combustion fuel known in the art.

The engine 102 may include other components (not shown), such as a fuel system, an intake system, a drivetrain including a transmission system, and the like. The engine 102 may be used to provide power to any machine including, but not limited to, an on-highway truck, an off-highway truck, an earth moving machine, an electric generator, and the like. The engine system 100 may be associated with an industry including, but not limited to, transportation, construction, agriculture, forestry, power generation, and material handling.

Referring to FIG. 1, the engine system 100 includes an aftertreatment system 104 fluidly connected to the engine 102 via an exhaust conduit 103. The aftertreatment system 104 is configured to treat an exhaust gas flow entering via the exhaust conduit 103 from the engine 102. The exhaust gas flow contains emission compounds that may include oxides of nitrogen (NOx), unburned hydrocarbons, particulate matter, and/or other combustion products known in the art. The aftertreatment system 104 may be configured to trap or convert NOx, unburned hydrocarbons, particulate matter, combinations thereof, or other combustion products present in the exhaust gas flow. The aftertreatment system 104 may contain various exhaust gas treatment devices, such as a diesel oxidation catalyst (DOC) (not shown) and an exhaust particulate filter system 110, but other devices may be used.

Figure 2:
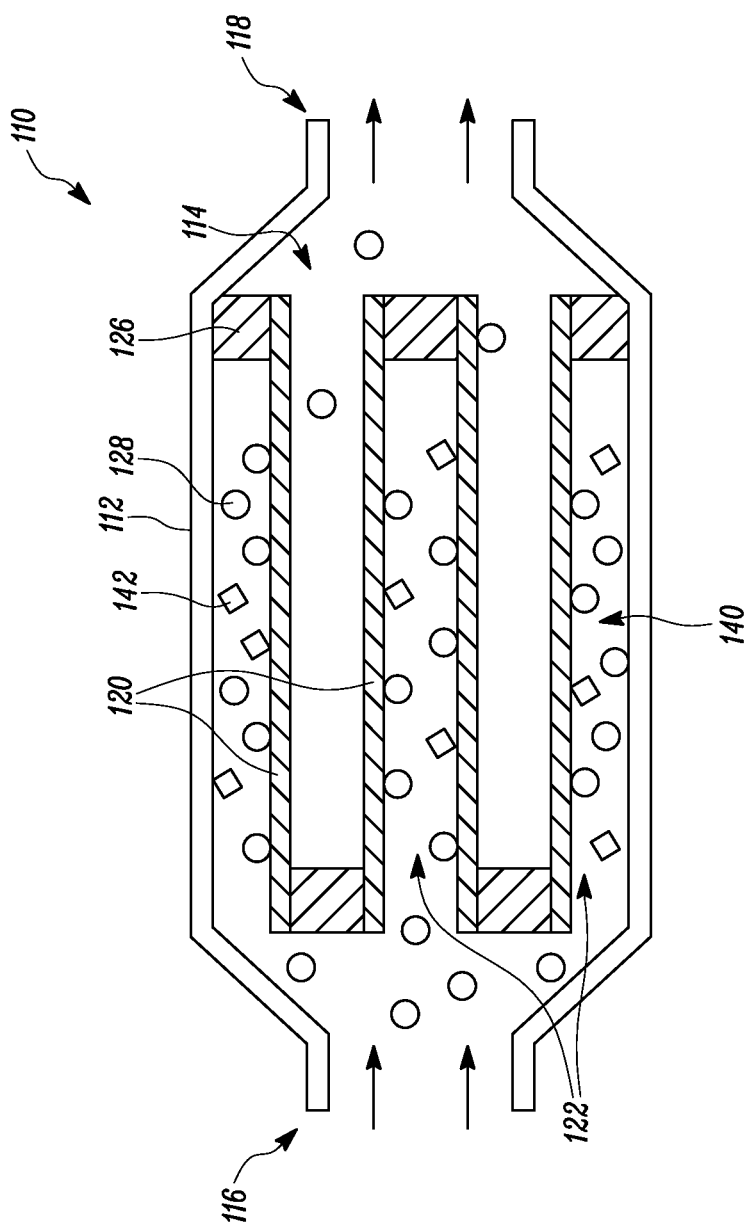
FIG. 2 is a cross sectional view of an exhaust particulate filter system, having exhaust gas flowing through the aftertreatment system, according to one embodiment of the present disclosure.

Referring to FIG. 2, a cross sectional view of the exhaust particulate filter system 110 is depicted. The exhaust particulate filter system 110 typically includes a cylindrical housing 112 supporting a catalyst substrate or filter 114. The cylindrical housing 112 includes a first end 116 and a second end 118. The filter 114 includes a number of filter walls 120. The filter walls 120 are configured to clean the exhaust gas during passage between the first and second ends 116, 118 of the filter 114. Although only a limited number of passages are shown, it should be appreciated that a typical filter 114 comprises numerous passages. The passages may be arranged alternately at the first and second ends 116, 118 such that exhaust gases entering the filter 114, for example, through the first end 116 via an open passage 122 may pass through the filter walls 120 and exit the filter 114 through the second end 118. The passages may include plugs 126 to force flow of exhaust gas through the filter walls.

Figure 3:
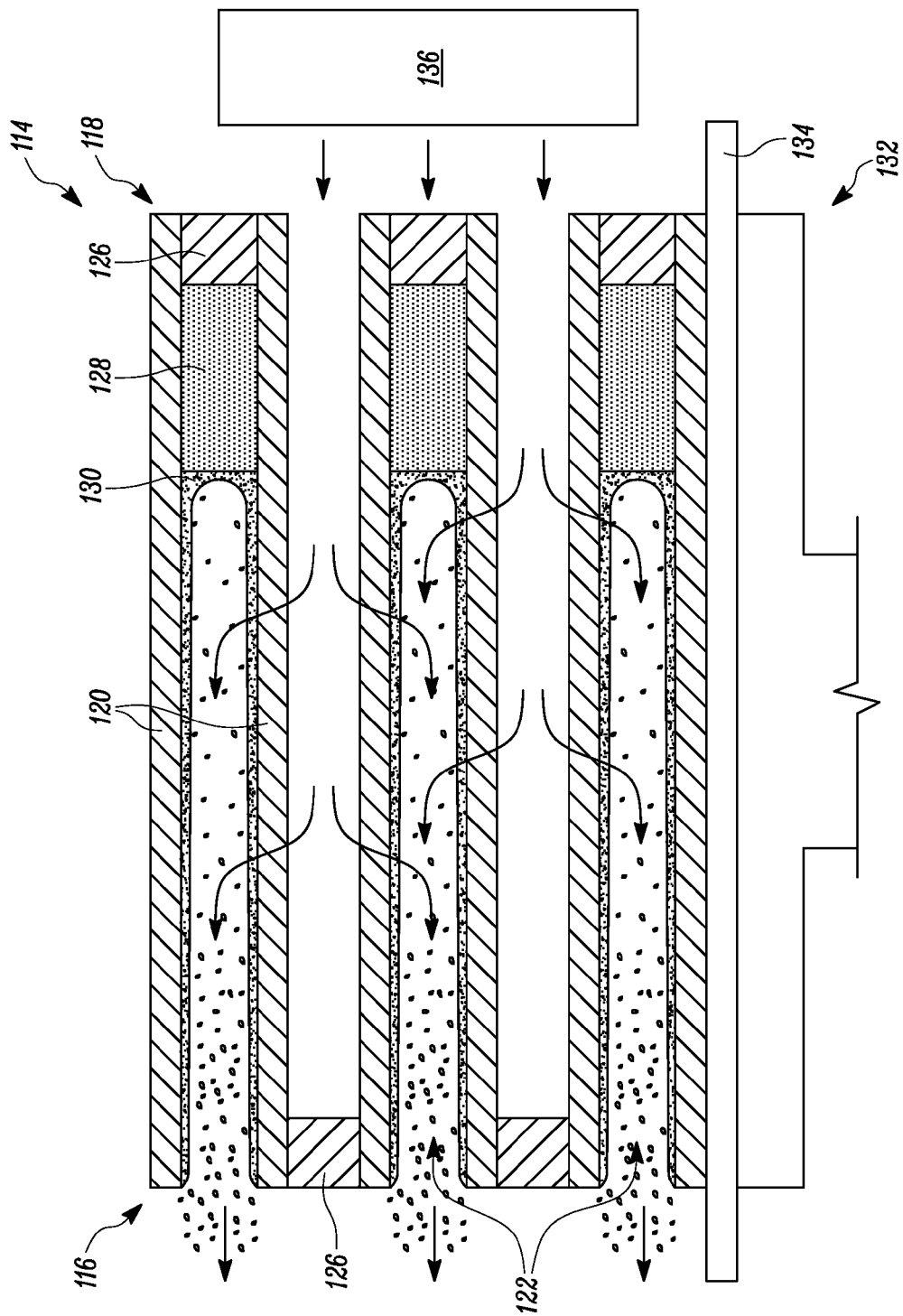
FIG. 3 illustrates a system for cleaning the filter, according to one embodiment of the present disclosure.

Referring to FIGS. 2 and 3, the exhaust gases flowing through the exhaust conduit 103 enter the filter 114 from the first end 116. The exhaust gases, which contain oxides of nitrogen (NOx), unburned hydrocarbons, particulate matter, and/or other combustion products, pass through the filter 114, and exits from the second end 118, trapping particulate matter in the process. More specifically, particulate matter in the exhaust gases, such as ash 128 and soot 142 is unable to pass through the filter 114 and accumulates along the filter walls 120. In addition, the ash 128 and soot 142 can also accumulate near the filter plugs 126 (shown in FIG. 3). The prolonged accumulation of the ash 128 and soot 142 may increase back pressure and thus decrease efficiency of engine performance. The exhaust particulate filter system 110 may require periodic cleaning to reduce back pressure.

In one embodiment, the cleaning of the exhaust particulate filter system 110 is done by means of a system 132. The system 132 includes a support fixture 134 for supporting the exhaust particulate filter system 110. The support fixture 134 may include any device or structure for supporting the exhaust particulate filter system 110. The support fixture 134 may include an arm (not shown) extending from a base that has an annular ring or other structure on the end thereof for fixedly engaging the aftertreatment system 104. Alternatively, the support fixture 134 may include a surface (not shown) for supporting the exhaust particulate filter system 110 on a top portion thereof. Any alternative structure for facilitating a relatively fixed position of the exhaust particulate filter system 110 is also contemplated. Although the figures depict the filter in a horizontal orientation, the present process may be performed with the filter in a vertical or other configuration.

The system 132 also includes a first apparatus 136. The first apparatus 136 is configured to provide compressed air. The first apparatus 136 may include a compressor (not shown) for compressing air. The first apparatus 136 may also include a tank (not shown) for storing the compressed air. The first apparatus 136 may also include means to provide compressed air at a desired pressure. It may be further contemplated that the first apparatus 136 may be selectively positioned at the first end 116 and the second end 118 of the aftertreatment system 104.

Figure 4:
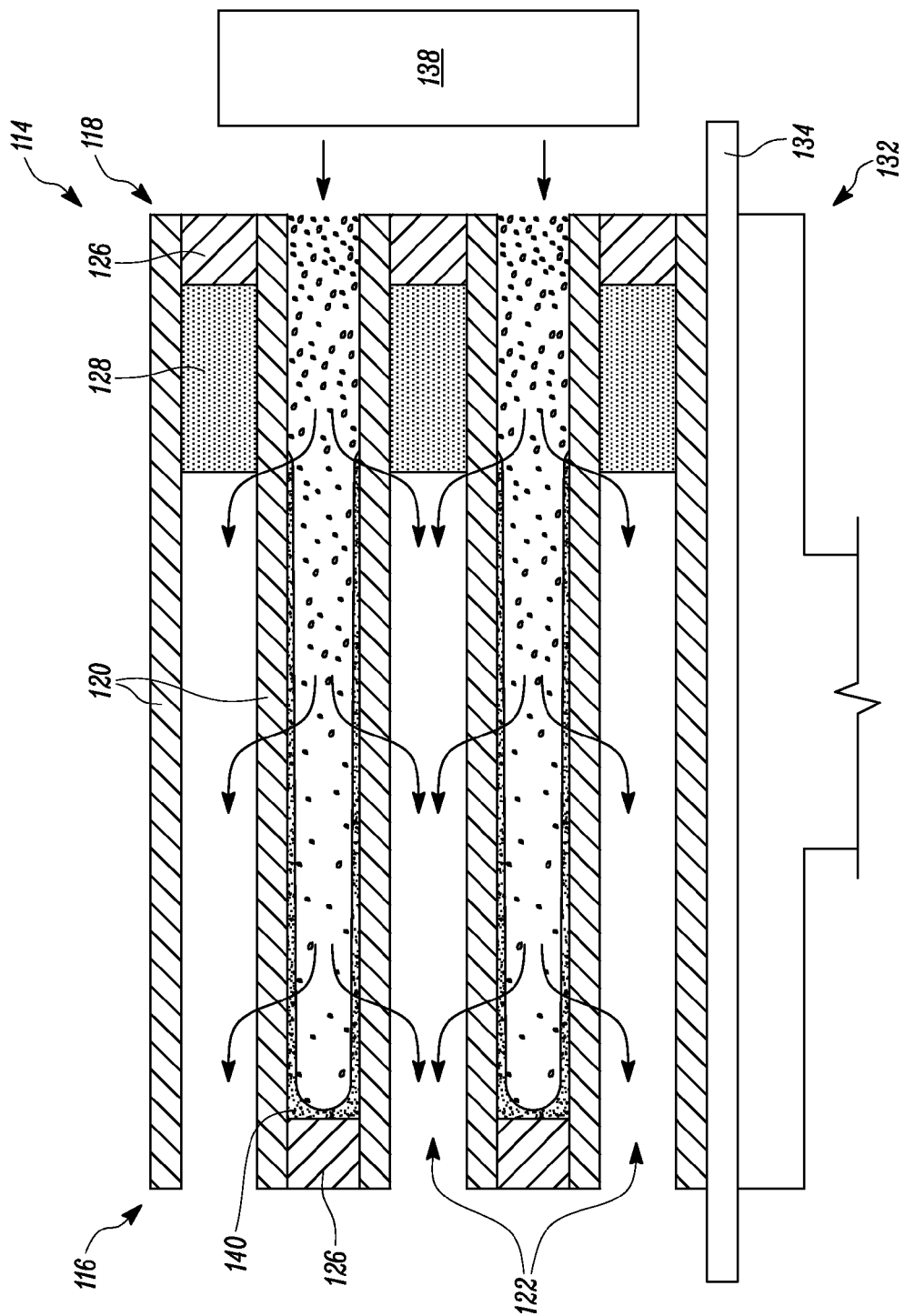
FIG. 4 illustrates the system for entraining particles, according to one embodiment of the present disclosure.
Figure 5:
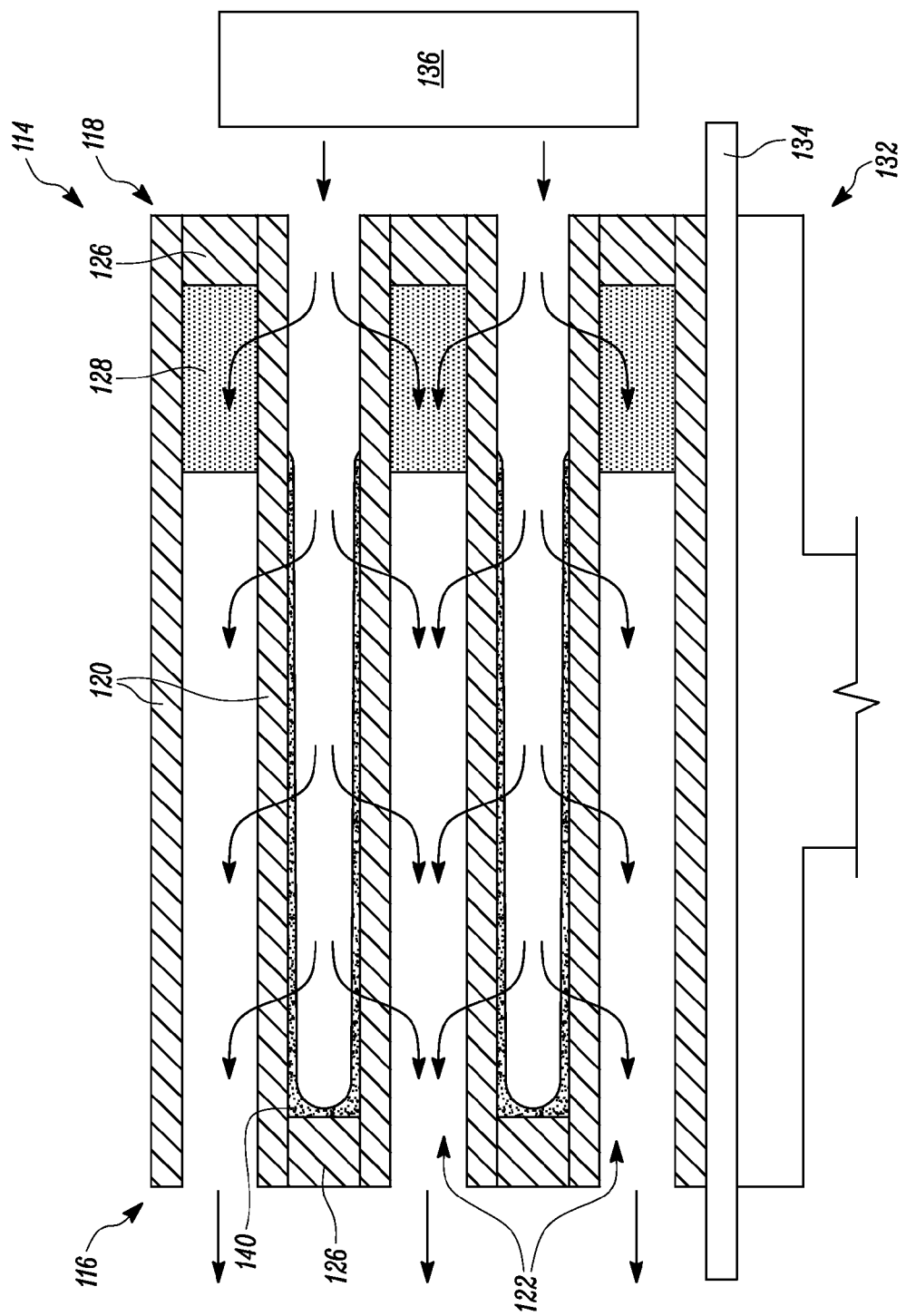
FIG. 5 illustrates the system for removal of ash plug from filter walls, according to one embodiment of the present disclosure.

FIGS. 4 and 5 illustrate the system 132 for cleaning the exhaust gas filter. The system includes a second apparatus 138. The second apparatus 138 may include a storage tank (not shown) to store particles 140. The second apparatus 138 may also include means to entrain the particles 140 at a certain pressure. During the cleaning of the exhaust particulate filter system 110 the first apparatus 136 is initially positioned at the second end 118. The first apparatus 136 introduces compressed air from the second end 118. The compressed air enters through the second end 118 that flows through the open passages 122 (shown by arrows). The compressed air further passes through the filter walls 120 and removes the mixture 130 of ash and soot and a portion of ash 128 located near the filter plugs 126.

Further, the second apparatus 138 is positioned at the second end 118 (shown in FIG. 5) of the exhaust particulate filter system 110. The second apparatus 138 introduces or entrains the particles 140 into the exhaust particulate filter system 110 by introducing air at low pressure. In one example, the particles 140 may be nonabrasive, combustible or non-combustible. Examples of suitable particles 140 may include powdered silica, carbon black, or some other material with suitable properties. The entrained particles 140 get deposited on regions of the filter walls 120 in areas having low amounts of ash 128. Accordingly, the entrained particles preferentially occupy the regions of the filter walls 120 which are not blocked on the other side, that is, in regions having higher permeability.

The first apparatus 136 is positioned at the second end 118. The first apparatus 136 introduces compressed air from the second end 118. When the compressed air enters through the second end 118, the entrained particles 140 reduce the permeability of the regions of the filter walls 120, and redirect more of the flow of the compressed air towards those regions of the filter walls 120 which have plugs of ash 128. The redirected flow of the compressed air facilitates the removal of the plugs of ash 128 from the first end 116.

Figure 6:
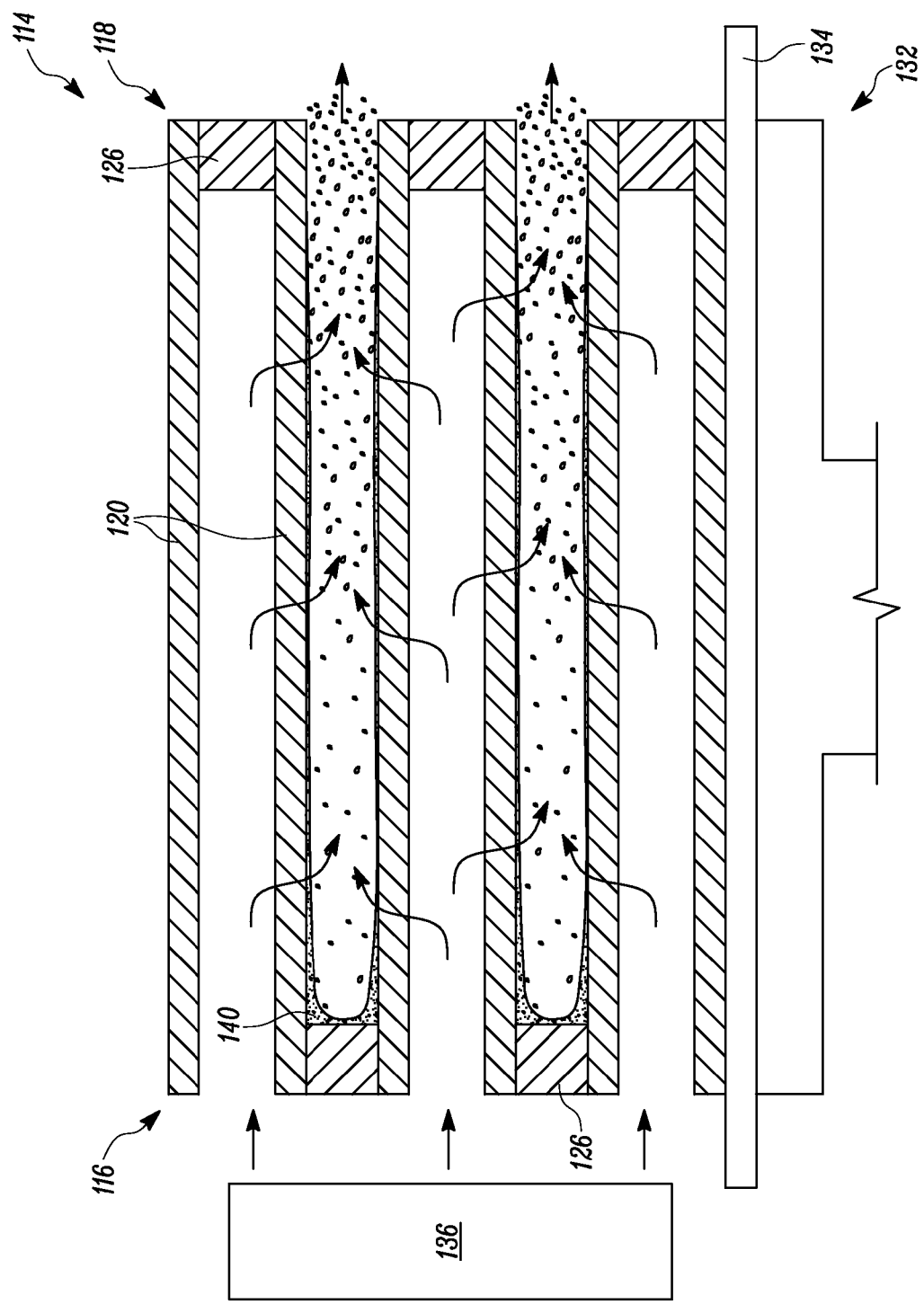
FIG. 6 illustrates the system for removal of the entrained particles from the filter walls, according to one embodiment of the present disclosure.

Referring to FIG. 6, the entrained particles 140 remain deposited along the filter walls 120. The first apparatus 136, which provides compressed air, is placed at the first end 116. The compressed air removes the entrained particles 140 from the second end 118. In one embodiment, the particles 140 may be further or completely removed by way of oxidation. After removal, the particles 140 may be re-used for ash removal of additional filters.

INDUSTRIAL APPLICABILITY

Figure 7:
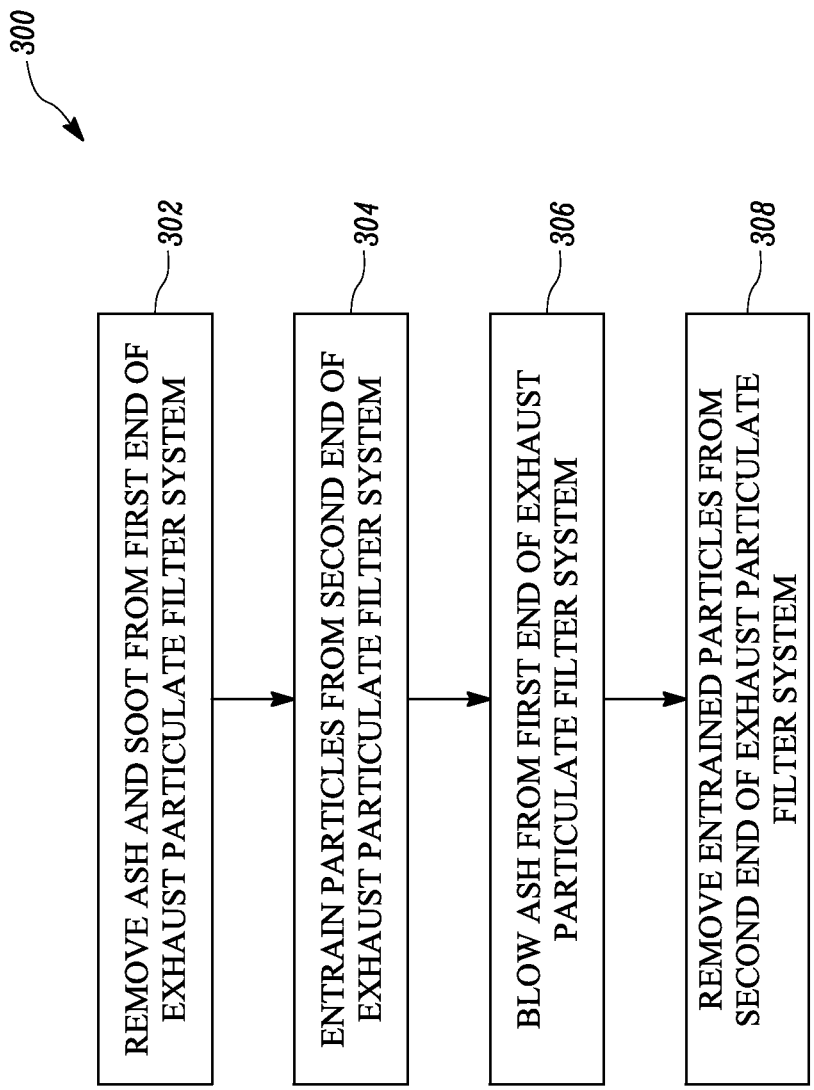
FIG. 7 illustrates a method flowchart for cleaning the exhaust particulate filter system.

The system 132 disclosed herein helps in removing ash 128 or other incombustible particles that accumulate in the filter 114 that cannot be removed during regeneration. The ash 128 that is retained in the filter 114 increases back pressure associated with the filter 114. FIG. 7 is a flowchart for a method 300 of cleaning the exhaust particulate filter system 132. At step 302, the mixture 130 of ash and soot is removed from the first end 116 of the exhaust particulate filter system 132. The ash 128 and soot 142 are heated, for example in a furnace with a gas flow containing oxygen until oxidation of the soot 142 takes place. The remaining ash 128 is blown from the first end 116 of the exhaust particulate filter 114 by blowing compressed air from the second end 118. Alternatively, the present process may be practiced without first removing the mixture 130 of ash and soot.

At step 304 the particles 140 are entrained and delivered to the second end 118 of the exhaust particulate filter 114. The particles 140 are entrained, for example using low pressure air from a blower (not shown). At step 306 the ash 128 is blown from the first end 116 of the exhaust particulate filter system 132 by blowing compressed air from the second end 118. At step 308, the entrained particles 140 are removed from the second end 118 of the exhaust particulate filter system 132 by blowing compressed air from the first end 116 of the exhaust particulate filter system 132. The entrained particles 140 preferably are non-abrasive and may be combustible or non-combustible. Further, the entrained particles 140 may be selected from a suitable list of materials including, but not limited to, powdered carbon (such as carbon black) and powdered silica.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of cleaning an exhaust particulate filter system comprising a first end and a second end, the method comprising,
    removing soot from the first end of the exhaust particulate filter system;
    entraining and delivering particles from the second end of the exhaust particulate filter system;
    blowing ash from the first end of the exhaust particulate filter system; and
    removing the entrained particles from the second end of the exhaust particulate filter system using compressed air from the first end of the exhaust particulate system.

2. The method according to claim 1 further comprising, oxidizing the soot and blowing the ash from the first end of the exhaust particulate filter system using compressed air from the second end of the exhaust particulate filter system.

3. The method according to claim 1 further comprising, entraining particles from the second end of the exhaust particulate filter system using low pressure air.

4. The method according to claim 1 further comprising, blowing ash from the first end of the exhaust particulate filter system using compressed air from the second end of the exhaust particulate filter system.

5. The method according to claim 1, wherein the entrained particles are combustible.

6. The method according to claim 1, wherein the entrained particles are non-combustible.

7. The method according to claim 1 wherein the entrained particles are powdered carbon.

8. The method according to claim 1 wherein the entrained particles are powdered silica.

9. A method of cleaning an exhaust particulate filter system comprising a first end and a second end, the method comprising,
    oxidizing soot accumulated in the exhaust particulate filter system;
    blowing ash from the first end of the exhaust particulate filter system using compressed air from the second end of the exhaust particulate filter system;
    entraining and delivering particles from the second end of the exhaust particulate filter system using low pressure air;
    blowing additional ash, following entraining and delivering particles, from the first end of the exhaust particulate filter system using compressed air from the second end of the exhaust particulate filter system; and
    removing the entrained particles from the second end of the exhaust particulate filter system using compressed air from the first end of the exhaust particulate filter system, wherein the entrained particles are powdered carbon.

* * * * *